Aug. 23, 1966  J. C. CLARK  3,268,182
SPOOL RETARDING AND LOCKING MEANS FOR FISHING REEL
Filed April 21, 1964  2 Sheets-Sheet 1

INVENTOR.
JOSEPH C. CLARK
BY
Lloyd Hudres

Aug. 23, 1966     J. C. CLARK     3,268,182
SPOOL RETARDING AND LOCKING MEANS FOR FISHING REEL
Filed April 21, 1964     2 Sheets-Sheet 2

INVENTOR.
JOSEPH C. CLARK
BY
Lloyd Hunter

United States Patent Office 3,268,182
Patented August 23, 1966

3,268,182
SPOOL RETARDING AND LOCKING MEANS
FOR FISHING REEL
Joseph C. Clark, Orlando, Fla., assignor to L & S Bait
Company of Florida, Inc., Clearwater, Fla., a corporation of Florida
Filed Apr. 21, 1964, Ser. No. 361,419
7 Claims. (Cl. 242—84.44)

This invention relates in general to fishing reels and more particularly to a casting reel with a thumb operated spool brake means and a lock therefor.

Reference is had to applicant's pending U.S. application Serial Number 217,442, filed August 16, 1962, for "Semi-Automatic Fishing Reel," now Patent No. 3,166,268, which illustrates the general character of the reel to which certain improvements have been made, to be hereinafter described.

It has been found that the thumb lever in the above reel may be inadvertently moved from the lock-wind to neutral position during transport or handling and thus free the line for entanglement and furthermore it has also been found that the provision of an adjustable means for sensitively applying a light drag on the spool during the casting operation will prevent "backlash" and otherwise control the cast to suit the user.

The construction of a positive lock for the thumb lever and an auxiliary spool drag adjustment are the principal features of the invention to be hereinafter described, including certain improvements to the clutch operating means responsive to the winding position of the thumb lever.

Figure 1:
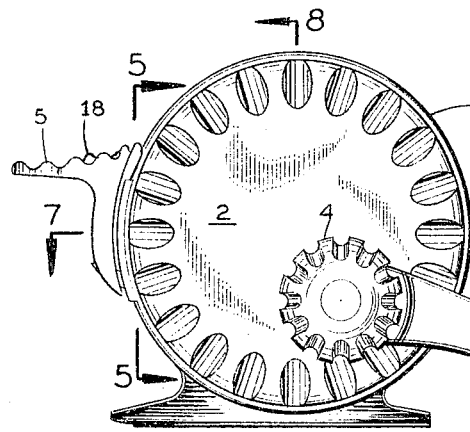
Figure 2:
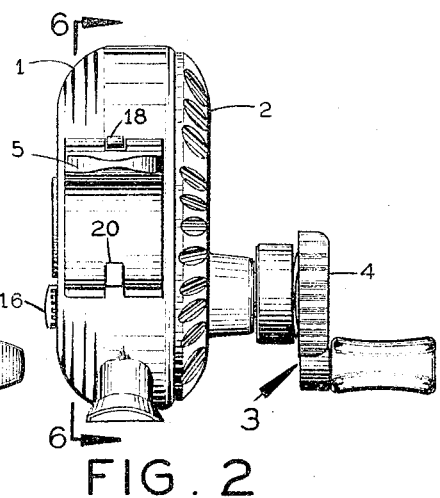
Figure 3:
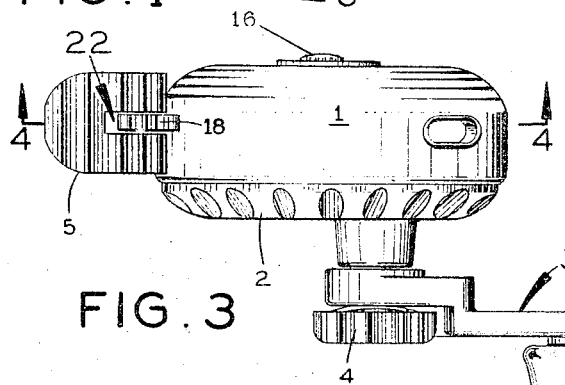
Figure 5:
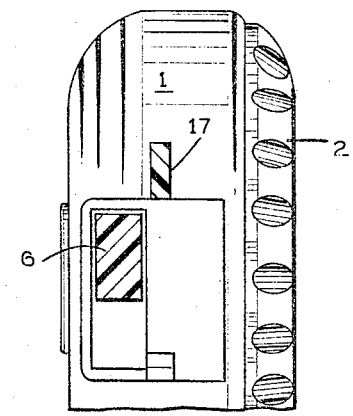
Figure 4:
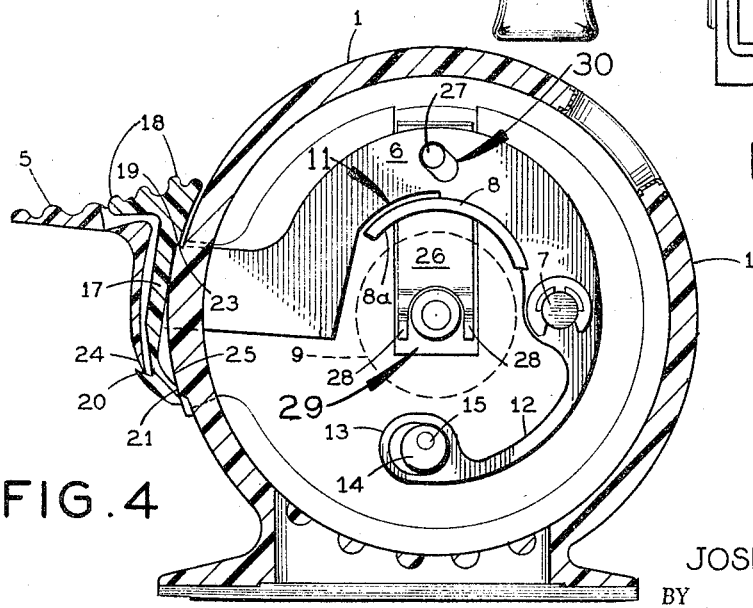
Figure 6:
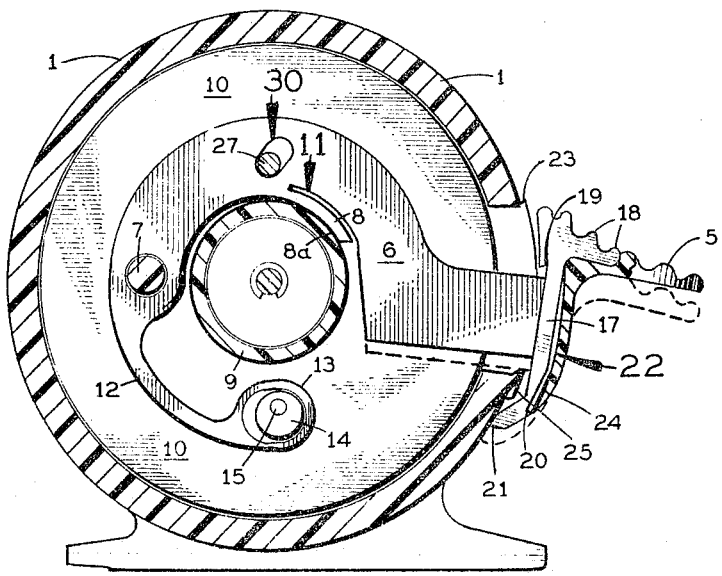
Figure 7:
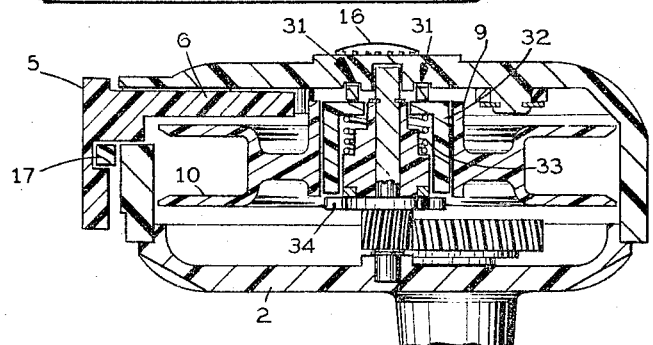
Figures 8, 9, 10:
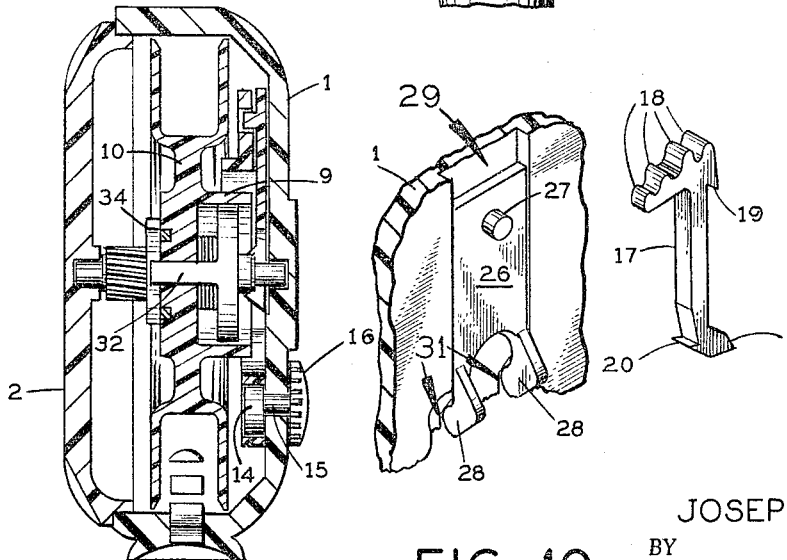

These and other objects in one embodiment of the invention are described and shown in the following specification and drawing, in which:

FIG. 1 is a right side elevation of the reel.
FIG. 2 is a rear end elevation of the reel, shown in FIG. 1.
FIG. 3 is a top plan view of the reel, shown in FIG. 1.
FIG. 4 is an enlarged cross sectional side elevation taken through section line 4—4, FIG. 3.
FIG. 5 is an enlarged fragmentary cross sectional rear view taken through section line 5—5, FIG. 1.
FIG. 6 is an enlarged cross sectional left elevation taken through section line 6—6, FIG. 2.
FIG. 7 is an enlarged cross sectional plan view taken through section line 7—7, FIG. 1.
FIG. 8 is a cross sectional elevation taken through section line 8—8, FIG. 1, with elements in changed position.
FIG. 9 is a perspective view of an element shown in FIGS. 3, 4, and 6.
FIG. 10 is a perspective view of an element shown in FIG. 8.

Referring to FIGS. 1, 2, and 3, the reel comprises a main housing 1 and a demountable cover member 2 and a crank assembly 3, coupled to a crank shaft and unidirectional rotation means therefor, not shown. A main drag means, not shown, is controlled by knob 4. Main control lever 6 projects through a suitable aperture in housing 1 and terminates in an integral thumb lever 5 having transverse corrugations therein. The lever is pivoted on a boss 7 integral with housing 1 and is retained thereon by a conventional fastener. An integral brake shoe 8 of the lever 6 is adapted to frictionally engage brake drum 9 integral with the spool 10, better shown in FIGS. 7 and 8.

A recess 11 in arm 6 permits radial flexure of the outer end 8a of the brake shoe 8 when in contact with the drum 9 for the application of a casting drag to the spool. An arm 12 of reduced cross section is integral with lever 6 and terminates in a loop 13, as shown in FIG. 4, which loop engages an eccentric 14 secured to a shaft 15, which shaft is journalled in casing 1 and terminates in integral control knob 16, better shown in FIG. 8. The lever 6 is preferably molded from plastic material of predetermined resilience for imparting spring-like flexure to arm 12 for normally urging same downward.

Referring to FIGS. 3 and 6, a thumb latch 17 is loosely positioned in a central recess 22 in thumb lever 5 which recess bisects lever 6.

The latch, better shown in FIG. 9, includes corrugations 18 and a pawl 19 on the upper end thereof and a hook 20 and cam surface 21 on the lower end thereof.

Referring to FIG. 6 and when the lever 6 is retained on boss 7 then the latch is captivated in recess 22 between housing 1 and the thumb lever 5 with hook 20 engaged with the lower end 24 of lever 5, and the cam surface 21 will be moved outward by cam surface 25 when the lever 6 is raised to its uppermost position which movement will result in pawl 19 moving inward into engagement with a land or abutment 23, thus locking and holding the lever 6 in its uppermost position by virtue of the camming action of the cam surfaces 21 and 25, and since the latch 17 is made from yieldable plastic the lower end of the latch will yield outward with respect to the lower edge 24 of the thumb lever 5 and thus urge the upper portion of the lever into holding engagement with land 23.

It is now apparent that when the latch 17 is moved outward by engagement of the thumb with corrugations 18 the lower portion of the latch will yield sufficiently to permit the pawl 19 to disengage from land 23 and permit the thumb lever 5 to be moved downward by virtue of the downward restraining action of arm 12. Thus the cam surfaces 21 and 25 will disengage, permitting the lever 6 to assume its idle neutral position, as shown in full lines in FIG. 6. When the thumb lever 5 is depressed to its lower braking position, as shown in dotted lines in FIG. 6, then brake shoe 8 will frictionally engage brake drum 9 by virtue of the slight flexure of the 8a portion of the brake shoe.

It is to be understood that the aforesaid neutral position refers to the position of the thumb lever just before manual braking begins and does not refer to the position of the lever as positioned for auxiliary casting drag by knob 16.

A clutch operating member 26, shown in FIG. 10, is provided with a cylindrical boss 27 and a pair of spaced like abutments 28 are positioned for slidable movement in a channel 29 in the inner side of casing 1, as shown in FIG. 4. The channel is provided with a pair of recesses 31—31 into the outer edges thereof with abutments 28 resting on the clutch member 32 in its normal retracted idle position, as shown in FIG. 7, under the influence of spring 33. The boss 27 is slidably retained in an oblique slot 30 in lever 6 and the inner ends of abutments 28 are positioned to engage clutch member 32 and move the latter inward for engagement with driven abutments 34 when the outer ends of abutments 28 cam upward out of recesses 31, against the sloping cam surfaces, when the lever 6 is moved to its upper winding or locked position.

In operation and referring to FIG. 6, the control lever 6 is shown in its neutral range with the outer end 8a of brake shoe 8 in light contact with the brake drum by virtue of a slight eccentricity of the curvature of the shoe with respect to the curvature of the drum (the eccentricity in FIG. 6 is exaggerated for illustrative purposes). The degree of friction applied to the drum by the outer end 8a is precisely controlled by the eccentric cam 14 which is adjustably positioned by knob 16. Thus when the thumb lever is in its free or casting position, a light pre-adjusted drag is applied to the spool to prevent backlash and otherwise control the cast to suit the user.

It is to be noted that near the completion of the cast, the spool is braked and stopped by the downward movement of lever 6 by the action of the thumb which will permit the outer end 8a of the brake shoe to flex sufficiently for high frictional engagement of the entire brake shoe against the drum 9.

When reeling in, the thumb lever 6 is moved to its upper locked or winding position and the clutch operating member 26 will be cammed from its inactive idle position to its engaged position by virtue of the engagement with boss 27. During the rise of the clutch member, the abutments 28 on the lower end thereof ride out of recesses 31 in the housing and the opposite sides of the abutments will move clutch member 32 laterally against the restraining action of spring 32 into engagement with driven abutments 34 which are rotated by the uni-directional rotation of the crank 3, as shown in FIG. 1. Thus the line may be "reeled in" in well known manner.

When the thumb lever 5 is moved to its upper position the lower end 21 of the latch 17 will cam against projection 25 and pivot the upper portion of the latch about hook 20 and engage upper pawl 19 with the land 23, thus holding the lever 6 locked in its winding position, as shown in FIG. 4.

When a cast is to be made the corrugations 18 are engaged simultaneously with the corrugations in thumb lever 5 by the thumb and the lever 17 will be flexed rearward sufficiently to disengage pawl 19 from the land 23 and thus release the lever 6 for downward movement to its brake position for the whip portion of the cast.

It is now apparent that a sensitive casting drag may be applied to the spool, and that when the line is fully reeled in the thumb lever will remain in locked position preventing the rotation of the spool and hence the withdrawal of the line by virtue of the fact that the transmission for rotating the spool is uni-directional and therefore cannot be reversed when the elver 6 is in the winding position.

It is understood that certain modifications in the construction, utilizing the features above described, are intended to come within the scope of the appended claims.

Having described my invention, I claim:

1. In a fishing reel for casting a line, a means forming a housing,
   a spool journalled for rotation in said housing including an integral coaxial brake drum,
   a thumb lever pivotally secured in said housing and projecting through an aperture therein and terminating in a thumb portion and adapted for movement from a neutral to a downward brake position,
   a brake shoe on said lever normally positioned and adapted to engage said drum when said lever is moved downward into said brake position for braking and stopping the rotation of said spool,
   a cam means in said housing coupled to a control knob projecting from said housing for manual adjustable movement thereby,
   a yieldable extension integral with said thumb lever in engagement with said cam means for operation thereby for normally holding said lever substantially in said neutral position,
   a portion of said brake shoe yieldable with respect to said lever whereby the manual adjustment of said cam means by said knob will move said lever toward said brake positioned with said portion of said shoe into predetermined frictional engagement with the drum against a constrained position of said extension for applying predetermined frictional drag to the said spool during the casting of said line.

2. In a fishing reel of the character described, a means forming a housing,
   a spool journalled for rotation in said housing for casting a line therefrom and winding said line therein when rotated in one direction,
   a crank-transmission means constructed and adapted to rotate said spool in said one direction and prevent same from rotating in a counter direction when engaged with said transmission,
   a clutch means in said housing for engaging said spool with said crank-transmission means when operated,
   a lever means in said housing including a thumb portion projecting therefrom for operating said clutch means when moved from a neutral to a winding position,
   a thumb latch pivotally retained in said thumb portion constructed and adapted for manual movement from a latch to an unlatched position,
   said latch including a pawl means for engagement with a land on said housing when said lever is in winding position whereby said line will be wound on said spool when said transmission is operated and whereby said line will be restrained from rotating said spool when said thumb lever is moved from said neutral into said winding position.

3. In a fishing reel of the character described, a means forming a housing,
   a spool journalled in said housing for rotation in a predetermined casting direction by a line wound thereon when the latter is pulled therefrom,
   a uni-directional crank operated transmission means journalled in said housing for rotating said spool in a winding direction opposite said casting direction when engaged with said spool,
   clutch means in said housing for engaging said spool with said transmission means when operated,
   lever means in said housing including a thumb portion projecting therefrom associated with said clutch means for operating the latter when moved from a neutral to a winding position,
   a latch means retained in said thumb portion for movement from a locked to idle position,
   an abutment on said housing for engaging said latch and locking said lever means in said winding position when said lever is manually moved thereto whereby said line will be wound on said spool when said transmission means is operated and whereby said spool is prevented from rotating in said casting direction when constrained by said line.

4. The construction recited in claim 3, including a recess in said thumb portion for pivotally retaining said latch means,
   a cam projecting from said housing adjacent said recess whereby the movement of said lever from said neutral to said winding position will cam said latch means against said cam projection and pivot the former into locked engagement with said abutment for holding said lever in said winding position.

5. The construction recited in claim 3, including at least one integral transverse projection on the upper end of said latch means positioned above said thumb portion for manually moving said latch out of engagement with said abutment and releasing said lever for movement from said winding to said neutral position.

6. In a reel of the character described, a means forming a housing,
   a thumb lever pivoted in said housing for manual movement from a neutral to a locked position for controlling said reel,
   a latch means pivoted in said lever for movement from an idle to a latched position corresponding to said idle and locked positions of said lever for holding the latter in said locked position,
   fixed cam means on said housing constructed and shaped to engage said latch means and move same from said idle to said latched position when said lever is moved from said neutral to said locked position.

7. In a reel of the character described, a means forming a housing, a spool including a coaxial brake drum thereon journalled for rotation in said housing, a main thumb lever pivoted in said housing for movement from a neutral to a brake position, a yieldable extension lever in said housing integral with said main lever for normally holding the latter in a substantially neutral position, a manual drag adjustment member journalled in said housing including a cam means thereon engaged with said extension lever for moving said main lever predetermined distances toward said brake position against the restraining action of said extension lever, a brake shoe means on said main lever for frictionally engaging said drum for braking and stopping the rotation of said spool when said main lever is moved into said brake position and whereby a portion of said shoe means will engage said drum and apply a predetermined casting drag to said spool dependent upon the adjustment of said adjustment member.

References Cited by the Examiner

UNITED STATES PATENTS

| | | | |
|---|---|---|---|
| 1,299,959 | 4/1919 | Keyser | 242—84.53 |
| 2,001,521 | 5/1935 | Cattley | 242—84.44 |
| 2,608,358 | 8/1952 | Kadets et al. | 242—84.53 |
| 2,690,310 | 9/1954 | Hayes | 242—84.54 |
| 3,166,268 | 1/1965 | Clark | 242—84.53 |

FOREIGN PATENTS

| | | |
|---|---|---|
| 469,385 | 5/1914 | France. |

FRANK J. COHEN, *Primary Examiner.*

MERVIN STEIN, *Examiner.*

B. S. TAYLOR, *Assistant Examiner.*